(12) United States Patent
Baumann et al.

(10) Patent No.: US 6,313,253 B1
(45) Date of Patent: Nov. 6, 2001

(54) BASIC CONDENSATION CATALYST SYSTEMS FOR SILOXANES

(75) Inventors: Frank Baumann, Mehring; Bernward Duebzer, Burghausen, both of (DE); Chantal Delagnes, Saint Fargeau (FR)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/478,566

(22) Filed: Jan. 6, 2000

(30) Foreign Application Priority Data

Jan. 14, 1999 (DE) .............................. 199 01 191

(51) Int. Cl.$^7$ ..................................... G08G 77/08
(52) U.S. Cl. ................................ 528/21; 528/14
(58) Field of Search ........................ 528/21, 14

(56) References Cited

U.S. PATENT DOCUMENTS

| 4,138,543 | * | 2/1979 | Bargain et al. . |
| 4,308,366 | | 12/1981 | Millet . |
| 4,362,855 | | 12/1982 | Millet et al. . |
| 4,820,673 | | 4/1989 | Knopf et al. . |

FOREIGN PATENT DOCUMENTS

| 0 023 187 A1 | 1/1981 | (EP) . |
| 0 023 187 B1 | 1/1981 | (EP) . |
| 0 039 299 A1 | 11/1981 | (EP) . |
| 0 180 527 A1 | 5/1986 | (EP) . |
| 2 398 079 | 7/1977 | (FR) . |

OTHER PUBLICATIONS

Derwent Abstract Corresponding To EP–A 0 180 527 (AN 1986–120646).
Derwent Abstract Corresponding To FR 2 398 079 (AN 1979–320083).
International Search Report—Apr. 2, 2000.
Derwent Abstract corresponding to EP 0023187 (AN 1981–08219D).
Derwent Abstract corresponding to EP 0180527 (AN 1986–120646).

* cited by examiner

*Primary Examiner*—Robert Dawson
*Assistant Examiner*—Marc S. Zimmer
(74) *Attorney, Agent, or Firm*—Brooks & Kushman P.C.

(57) ABSTRACT

The invention relates to a process for the condensation of compounds which carry silanol groups and have at least one unit of the general formula (III)

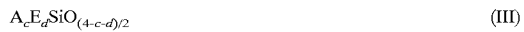

in which

A is a hydroxyl group,

E is an inert radical, c is 1, 2, 3 or 4 and d is 0, 1 or 2, with the proviso that c+d $\leq$ 4, in which higher molecular weight organosiloxane compounds are prepared by employing with a catalyst system comprising a catalyst which is chosen from basic alkali metal and alkaline earth metal compounds and a cocatalyst which is an at least bidentate chelating ligand and contains units of the general formula (I)

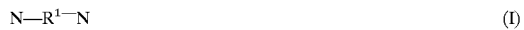

in which $R^1$ is a divalent linear, cyclic and/or aromatic $C_1$-to $C_{30}$-hydrocarbon radical.

20 Claims, No Drawings

BASIC CONDENSATION CATALYST SYSTEMS FOR SILOXANES

TECHNICAL FIELD

The invention relates to a process for the condensation of compounds carrying silanol groups, in which basic catalyst systems are employed.

BACKGROUND ART

Basic condensation and equilibration catalysts are understood as meaning compounds which generate a pH of >7 in water, either directly, or due to their hydrolysis products, such as metal hydroxides or metal alkoxides of main groups I and II of the Periodic Table, or ammonium hydroxides, for example butyltrimethylammonium hydroxide (BTAH) or tetramethylammonium hydroxide (TMAH) and the like.

Basic condensation and equilibration catalysts are chiefly used in silicone chemistry for the preparation of siloxanes carrying amino groups and in resin synthesis, such as for the preparation of MQ resins. Basic catalysts are also used in the macroscopic gelling of alkoxysilanes for precursors of aero- and xerogels. Another field of use of "non-acid" condensation catalysts is vulcanization of silicone rubber compositions with organometallic compounds, for example tin compounds.

Disadvantages of the catalysts described above are that in addition to catalyzing the condensation reaction they also have always catalyzed the equilibration reaction, or that the rate of condensation is too low. Tin compounds are the only pure condensation catalysts, but these are not suitable for condensation of organosiloxanes to obtain higher molecular weights. Cryptates are disclosed in EP-B-23 187, and tri-oxoalkylamines in EP-A-180 527, as additives for optimizing the condensation properties of alkali metals and alkaline earth metals. The disadvantage of these catalyst systems is their high polarity and therefore their incompatibility with the siloxanes.

DISCLOSURE OF INVENTION

The object of the present invention is the development of a process for the polycondensation of organosiloxanes in which equilibration is not catalyzed and with which high molecular weights can be achieved.

BEST MODE FOR CARRYING OUT THE INVENTION

The invention relates to a process for the condensation of compounds which carry silanol groups and have at least one unit of the general formula (III)

$$A_c E_d SiO_{(4-c-d)/2} \qquad (III)$$

in which
  A is a hydroxyl group,
  E is an inert radical,
  c is the value 1, 2, 3 or 4 and
  d is the value 0, 1 or 2, with the proviso that c+d≦4, in which higher molecular weight organosiloxane compounds are prepared with a catalyst system comprising a catalyst chosen from basic alkali metal and alkaline earth metal compounds and a cocatalyst which is an at least bidentate chelating ligand and contains units of the general formula (I)

$$N-R^1-N \qquad (I)$$

in which
  $R^1$ is a divalent linear, cyclic and/or aromatic $C_1$-to $C_{30}$-hydrocarbon radical.

With the aid of these catalyst systems, compounds which carry silanol groups can undergo polycondensation to higher molecular weight compounds without being equilibrated.

The catalyst comprises an alkali metal compound or alkaline earth metal compound, or a mixture of alkali metal compound and alkaline earth metal compound, which achieves a pH of >7.0 in water and preferably corresponds to the general formula (II)

$$M_a-(R^2)b \qquad (II),$$

in which
  M is an alkali metal atom or alkaline earth metal atom,
  $R^2$ is a monovalent group such as a hydroxyl, amine, $C_1$-to $C_{18}$-alkoxy or silicate group, a group which reacts with water to produce basic species, such as a hydrogen, amide or $C_1$-to $C_{30}$-hydrocarbon radical, or an oxidic metal compound, such that the compound $M_a-(R^2)b$, when added to water, renders the water alkaline,
  a has the values 1 and 2, and in the case of alkali metals preferably the value 1, and
  b has the values 1 and 2, with the proviso that in the case of alkali metals b can only assume the value 1.

Preferably, M is lithium, sodium, potassium, rubidium, cesium, calcium, strontium, or barium, in particular lithium or barium.

The $C_1$-to $C_{18}$-alkoxy group $R^1$ preferably is a methoxy or ethoxy radical. The $C_1$-to $C_{30}$-h-hydrocarbon radical $R^2$ is preferably a propyl or butyl radical. Preferred radicals $R^1$ are $C_1$-to $C_4$-hydrocarbon radicals, in particular the $C_2$ radical.

The cocatalysts are preferably linear or cyclic compounds which contain at least one and not more than 20 units of the general formula (I). Examples of these are 3,5-diazacyclohexane, 3,5,7-triazacyclooctane and ethylenediamine oligomers of the general formula $H_2N-(CH_2CH_2NH)_x-H$, wherein x can be an integer from 1 to 20.

The linear compounds which contain 1 to 5 units of the general formula (I) are particularly preferred here. Examples of these are ethylenediamine, diethylenetriamine, triethylenetetramine and tetraethylenepentamine.

Preferably, the radical E is a monovalent, optionally halogen- or cyano-substituted $C_1$-to $C_{30}$-hydrocarbon radical bonded via SiC, in particular a $C_1$-to $C_6$-hydrocarbon radical, such as the methyl, ethyl and phenyl radicals.

The compound carrying silanol groups can also first be formed during a reaction step, for example by the hydrolysis of a chlorosilane, and can then participate in the condensation reaction.

In the examples described below, all the parts and percentage data are by weight, unless stated otherwise. Unless stated otherwise, the following examples were carried out under a pressure of the surrounding atmosphere, that is to say about 1000 hPa.

EXAMPLES

Example 1

0.9 g (1800 ppm) of diethylenetriamine are added as a cocatalyst to a mixture of 450 g (0.198 mol) of a siloxane with α, ω—OH end groups and with a chain length of about 34 Me$_2$SiO units (Me-siloxane) and 50 g of a siloxane with trimethylsilyl end groups and with a chain length of 35 Me$_2$SiO units (Ak35). The mixture is heated to 80° C.

Thereafter, 3.0 g (600 ppm) of a 10% strength lithium hydroxide solution in water are added and a vacuum of 200 mbar is applied to the reaction vessel, the solution water and the water formed during the polycondensation being removed from the reaction mixture and separated off via a water separator. A marked increase in viscosity is observed during the reaction. After a reaction time of four hours, the catalyst is neutralized with 1.5 g of glacial acetic acid. The mixture is subsequently stirred at 80° C. for 1 hour, cooled to room temperature and filtered.

The product has a viscosity of 14,500 mPas. Furthermore, a bimodal molecular weight distribution is detected in the GPC. The low molecular weight peak here can be assigned unambiguously to the low molecular weight siloxane with trimethylsilyl end groups and with a chain length of 35 Me$_2$SiO units. It can thus be shown that the catalyst system used does not have an equilibrating action. Further evidence of this property is that no octamethylcyclotetrasiloxane rings (D$_4$) are formed during the reaction, these always being obtained as a by-product of an equilibration reaction (see Comparison Examples V2a to V2e), which can also be demonstrated with the aid of the $^{29}$Si-NMR data.

Example 2

The reaction is conducted analogously to Example 1. Only the catalyst is changed. 3 g of a 10% strength barium hydroxide solution are used.

The resulting product has a viscosity of about 200,000 mPas. The same result as in Example 1 is obtained in the GPC.

Example 3 (variation of the cocatalyst)

The reaction is conducted analogously to Example 1. Only the cocatalyst is changed. The examples and the results are summarized in Table 1.

TABLE 1

| Example | Cocatalyst | Viscosity | GPC | D4 content |
|---|---|---|---|---|
| 3a | Ethylenediamine | 15,000 | Bimodal | <0.5 mol % |
| 3b | Aminopropylamino-ethyldiethoxy silane hydrolysis product | 14,500 | Bimodal | <0.5 mol % |

COMPARISON EXAMPLES

Comparison Example 1

The reaction is conducted analogously to Example 1. However, no cocatalyst is used.

The resulting viscosity is about 1000 mPas. A multimodal distribution of low molecular weight organosiloxanes is obtained in the GPC. Without addition of a cocatalyst, no high molecular weight is achieved in the polycondensation with LiOH.

Comparison Example 2

The reaction is conducted analogously to Example 1. However, the alkali metal hydroxides listed in Table 2, in a 50% strength solution in water, are used as the cocatalyst.

TABLE 2

| Example | Catalyst | Viscosity | D4 | GPC |
|---|---|---|---|---|
| V2a | NaOH | 3200 | 3.5 | Monomodal |
| V2b | KOH | 2200 | 8.0 | Monomodal |
| V3c | RbOH | 2300 | 10.0 | Monomodal |
| V4d | CsOH | 2400 | 10.0 | Monomodal |
| V4e | BTAH | 2200 | 7.0 | Monomodal |

A monomodal distribution is obtained in the GPC. Furthermore, the resulting viscosities and D$_4$ constituents clearly indicate that an equilibration reaction with the Ak35 has taken place simultaneously with the polycondensation of the Me-siloxane, and a lower average chain length than in a pure polycondensation is thus established.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the condensation of compounds which carry silanol groups and have at least one unit of the general formula (III)

$$A_c E_d SiO_{(4-c-d)/2} \quad \text{(III)}$$

in which
A is a hydroxyl group,
E is an inert radical,
c is 1, 2, 3 or 4, and
d is 0, 1 or 2,
with the proviso that c+d ≦4, in which high molecular weight organosiloxane compounds are prepared by condensation with a catalyst system comprising at least one catalyst consisting of basic alkali metal and alkaline earth metal compounds, and a linear cocatalyst which is an at least bidentate chelating ligand containing 1 to 20 units of the general formula (I)

$$N-R^1-N \quad \text{(I)}$$

in which
R$^1$ is a divalent linear, cyclic and/or aromatic C$_1$-to C$_{30}$-hydrocarbon radical.

2. The process of claim 1, in which E is a monovalent, optionally halogen- or cyano-substituted, SiC-bonded C$_1$- to C$_{30}$-hydrocarbon radical.

3. The process of claim 1, wherein the catalyst comprises an alkali metal compound or alkaline earth metal compound or a mixture of alkali metal compounds and alkaline earth metal compounds which exhibits a pH of >7.0 in water and corresponds to the general formula (II)

$$M_a-(R^2)_b \quad \text{(II)}$$

in which
M is an alkali metal atom or alkaline earth metal atom,
R$^2$ is a monovalent group such that the compound (II), when added to water, renders the water alkaline,
a is 1 or 2, and
b is 1 or 2, with the proviso that when M is an alkali metal, b is 1.

4. The process of claim 2, wherein the catalyst comprises an alkali metal compound or alkaline earth metal compound or a mixture of alkali metal compounds and alkaline earth metal compounds which exhibits a pH of >7.0 in water and corresponds to the general formula (II)

in which

M is an alkali metal atom or alkaline earth metal atom, $R^2$ is a monovalent group such that the compound (II), when added to water, renders the water alkaline, a is 1 or 2, and b is 1 or 2, with the proviso that when M is an alkali metal, b is 1.

5. The process of claim 3, in which M is lithium or barium.

6. The process of claim 4, in which M is lithium or barium.

7. The process of claim 3, in which $R^2$ is a hydroxyl group.

8. The process of claim 4, in which $R^2$ is a hydroxyl group.

9. The process of claim 5, in which $R^2$ is a hydroxyl group.

10. The process of claim 3, in which the cocatalysts are linear compounds which contain one to 20 units of the general formula (I).

11. The process of claim 4, in which the cocatalysts are linear compounds which contain one to 20 units of the general formula (I).

12. The process of claim 5, in which the cocatalysts are linear compounds which contain one to 20 units of the general formula (I).

13. The process of claim 7 in which the cocatalysts are linear compounds which contain one to 20 units of the general formula (I).

14. The process as claimed in claim 3, in which $R^1$ is a $C_1$- to $C_4$-hydrocarbon radical.

15. The process as claimed in claim 4, in which $R^1$ is a $C_1$- to $C_4$-hydrocarbon radical.

16. The process as claimed in claim 5, in which $R^1$ is a $C_1$- to $C_4$-hydrocarbon radical.

17. The process as claimed in claim 7, in which $R^1$ is a $C_1$- to $C_4$-hydrocarbon radical.

18. The process as claimed in claim 10, in which $R^1$ is a $C_1$- to $C_4$-hydrocarbon radical.

19. A process for the condensation of silanol-functional organopolysiloxanes in the presence of equilibratable organopolysiloxanes without equilbration of said equilibratable organopolysiloxanes, said process comprising catalyzing said condensation with a condensation catalyst comprising a basic alkali metal compound, alkaline earth metal compound, or mixture thereof, said catalyst exhibiting an aqueous pH>7.0, and a cocatalyst which is an at least bidentate chelating ligand having from 1 to 20 N—$R^1$-N units, in which $R^1$ is a divalent linear, cyclic, or aromatic $C_{1-30}$ hydrocarbon radical.

20. The process of claim 3, which $R^2$ comprises one or more groups selected from hydroxyl, amine, $C_{1-18}$-alkoxy, silicate, oxide, hydride, amide, and $C_{1-30}$ hydrocarbon.

* * * * *

UNITED STATES PATENT AND TRADEMARK OFFICE
CERTIFICATE OF CORRECTION

PATENT NO.    : 6,313,253 B1
DATED         : November 6, 2001
INVENTOR(S)   : Frank Baumann, Bernward Deubzer and Chantal Delagnes It is certified that error appears in the above-identified patent and that said Letters Patent is hereby corrected as shown below:

<u>Title page,</u>
Item [75], Inventor, "Bernward Duebzer" should read -- Bernward Deubzer --.

Signed and Sealed this

Tenth Day of June, 2003

JAMES E. ROGAN
*Director of the United States Patent and Trademark Office*